(12) United States Patent
Poston et al.

(10) Patent No.: US 7,447,608 B1
(45) Date of Patent: Nov. 4, 2008

(54) METHOD AND APPARATUS FOR A COLLABORATIVE MEETING ROOM SYSTEM

(75) Inventors: Rene Poston, Portland, OR (US); David Elliot Slobodin, Lake Oswego, OR (US); Paul Long, Newberg, OR (US); Curt Kessler, Portland, OR (US); Steve Murtha, Portland, OR (US); Lorenzo Dunn, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 1081 days.

(21) Appl. No.: 10/259,371

(22) Filed: Sep. 27, 2002

Related U.S. Application Data

(60) Provisional application No. 60/325,792, filed on Sep. 28, 2001.

(51) Int. Cl.
*G06F 3/01* (2006.01)
(52) U.S. Cl. .................. 702/178; 702/177; 702/187; 702/188
(58) Field of Classification Search ............... 702/56, 702/182, 183, 185, 188, 189, 177, 178, 187; 345/358, 863; 709/205; 715/762; 346/863
See application file for complete search history.

(56) References Cited

U.S. PATENT DOCUMENTS

| 5,745,711 | A |   | 4/1998  | Kitahara et al. ........... 715/759 |
| 5,767,897 | A |   | 6/1998  | Howell .................... 348/14.07 |
| 5,859,623 | A |   | 1/1999  | Meyn et al. ............... 715/730 |
| 5,862,325 | A |   | 1/1999  | Reed et al. ................ 709/201 |
| 5,918,239 | A |   | 6/1999  | Allen et al. ............... 715/526 |
| 5,923,326 | A |   | 7/1999  | Bittinger et al. .......... 715/805 |
| 5,924,013 | A |   | 7/1999  | Guido ...................... 725/67 |
| 5,987,454 | A |   | 11/1999 | Hobbs ...................... 707/4 |
| 6,005,534 | A |   | 12/1999 | Hylin et al. ............... 345/2.1 |
| 6,018,346 | A | * | 1/2000  | Moran et al. .............. 715/863 |
| 6,025,871 | A | * | 2/2000  | Kantor et al. ............ 348/14.07 |
| 6,047,288 | A | * | 4/2000  | Kurosawa et al. .......... 707/9 |
| 6,088,717 | A |   | 7/2000  | Reed et al. ................ 709/201 |
| 6,091,409 | A |   | 7/2000  | Dickman et al. .......... 715/847 |
| 6,105,055 | A |   | 8/2000  | Pizano et al. ............. 709/204 |
| 6,108,687 | A |   | 8/2000  | Craig ....................... 709/203 |
| 6,134,584 | A |   | 10/2000 | Chang et al. .............. 709/219 |
| 6,137,794 | A |   | 10/2000 | Brown ...................... 370/360 |

(Continued)

OTHER PUBLICATIONS

PlaceWare Web Conferencing, "Presenter's Guide for Web Meeting Places", Version 4.3, Published Apr. 2003.

(Continued)

*Primary Examiner*—Eliseo Ramos-Feliciano
*Assistant Examiner*—Felix Suarez
(74) *Attorney, Agent, or Firm*—Alleman Hall McCoy Russell & Tuttle, LLP

(57) ABSTRACT

A method and apparatus for a collaborative meeting room system. In response to user input, an electronic device starts a meeting timer to begin timing a meeting at which a previously-created meeting agenda is used. The electronic device causes a projection device to project a running meeting timer, as a result of starting the meeting timer. An agenda item included in the previously-created meeting agenda is retrieved, as a result of starting the meeting timer. The electronic device causes the projection device to project meeting minutes for the agenda item, as a result of retrieving the agenda item.

22 Claims, 19 Drawing Sheets

U.S. PATENT DOCUMENTS

| | | | |
|---|---|---|---|
| 6,167,033 A | 12/2000 | Chang et al. | 370/204 |
| 6,167,432 A | 12/2000 | Jiang | 709/204 |
| 6,237,026 B1 | 5/2001 | Prasad et al. | 709/204 |
| 6,288,753 B1 | 9/2001 | DeNicola et al. | 348/586 |
| 6,310,941 B1 | 10/2001 | Crutcher et al. | 379/88.17 |
| 6,317,777 B1 | 11/2001 | Skarbo et al. | 709/204 |
| 6,330,243 B1 | 12/2001 | Strandberg | 370/396 |
| 6,345,239 B1 | 2/2002 | Bowman-Amuah | 703/6 |
| 6,345,288 B1 | 2/2002 | Reed et al. | 709/201 |
| 6,351,777 B1 | 2/2002 | Simonoff | 709/250 |
| 6,353,848 B1 | 3/2002 | Morris | 709/203 |
| 6,356,943 B2 | 3/2002 | Murray et al. | 709/220 |
| 6,359,711 B1 | 3/2002 | Cole et al. | 359/118 |
| 6,363,352 B1 | 3/2002 | Dailey et al. | 705/9 |
| 6,385,195 B2 | 5/2002 | Sicher et al. | 370/356 |
| 6,388,654 B1 | 5/2002 | Platzker et al. | 439/595 |
| 6,388,688 B1 | 5/2002 | Schileru-Key | 715/854 |
| 6,393,380 B1 | 5/2002 | Zemlo | 702/188 |
| 6,400,462 B1 | 6/2002 | Hille | 358/1.14 |
| 6,404,747 B1 | 6/2002 | Berry et al. | 370/270 |
| 6,414,635 B1 | 7/2002 | Stewart et al. | 342/457 |
| 6,424,994 B1 | 7/2002 | Pirich et al. | 709/205 |
| 6,427,132 B1 | 7/2002 | Bowman-Amuah | 703/22 |
| 6,437,786 B1 | 8/2002 | Yasukawa | 345/474 |
| 6,438,111 B1 | 8/2002 | Catanzaro et al. | 370/260 |
| 6,449,001 B1 | 9/2002 | Levy et al. | 348/14.08 |
| 6,449,344 B1 | 9/2002 | Goldfinger et al. | 379/88.17 |
| 6,463,460 B1 | 10/2002 | Simonoff | 709/203 |
| 6,489,934 B1 | 12/2002 | Klausner | 345/1.1 |
| 6,522,352 B1 | 2/2003 | Strandwitz et al. | 348/211.2 |
| 6,523,022 B1 | 2/2003 | Hobbs | 707/3 |
| 6,542,927 B2 | 4/2003 | Rhoads | 709/217 |
| 6,549,937 B1 | 4/2003 | Auerbach et al. | 607/126 |
| 6,560,637 B1 | 5/2003 | Dunlap et al. | 709/204 |
| 6,564,005 B1 | 5/2003 | Berstis | 386/83 |
| 6,567,813 B1 | 5/2003 | Zhu et al. | 707/100 |
| 6,697,840 B1 * | 2/2004 | Godefroid et al. | 709/205 |
| 7,007,235 B1 * | 2/2006 | Hussein et al. | 715/751 |
| 2001/0003479 A1 | 6/2001 | Fujiwara | 353/122 |
| 2002/0049788 A1 | 4/2002 | Lipkin et al. | 707/513 |
| 2002/0174085 A1 | 11/2002 | Nelson et al. | 707/1 |
| 2002/0175915 A1 | 11/2002 | Lichtfuss | 345/440 |
| 2002/0196378 A1 | 12/2002 | Slobodin et al. | 348/744 |
| 2003/0053033 A1 | 3/2003 | Vrachan et al. | 353/31 |

OTHER PUBLICATIONS

WebEx Communications, "WebEx meeting Center", Published 2002.

NetMeeting 101, http://meetingbywire.com/NetMeeting101.htm/, May 1, 2003.

* cited by examiner

FIG. 7A

Meeting Math - MS Exchange Settings

TC: $72630

Total Cost | Total Hours | My Hours | Weekly Ave.

Select Time Frame:
○ Last Year
● This Year (To Date) — 710
○ This Month (To Date)

Select Meetings:
○ Meetings I'm the Organizer of
● Meetings I'm the Attendee

Ave. Hourly Rate: [$45 per hour (IFS Ave.) ▾]

Calculate 701  702  703

FIG. 7B

Meeting Math - MS Exchange Settings

TH: 1614.00

Total Cost | Total Hours | My Hours | Weekly Ave.

Select Time Frame:
○ Last Year
● This Year (To Date) — 720
○ This Month (To Date)

Select Meetings:
○ Meetings I'm the Organizer of
● Meetings I'm the Attendee

Ave. Hourly Rate: [$45 per hour (IFS Ave.) ▾]

Calculate

FIG. 7C

Meeting Math - MS Exchange Settings

MH: 241.00

Total Cost | Total Hours | My Hours | Weekly Ave.

730

Select Time Frame:
- ○ Last Year
- ⦿ This Year (To Date)
- ○ This Month (To Date)

Select Meetings:
- ○ Meetings I'm the Organizer of
- ⦿ Meetings I'm the Attendee Ave. Hourly Rate: [$45 per hour (IFS Ave.) ▾]

[Calculate]

FIG. 7D

Meeting Math - MS Exchange Settings

AVE: 6.18

Total Cost | Total Hours | My Hours | Weekly Ave.

740

Select Time Frame: ~742
- ○ Last Year
- ⦿ This Year (To Date)
- ○ This Month (To Date)

Select Meetings: ~744
- ○ Meetings I'm the Organizer of
- ⦿ Meetings I'm the Attendee Ave. Hourly Rate: ~746 [$45 per hour (IFS Ave.) ▾]

[Calculate]

METHOD AND APPARATUS FOR A COLLABORATIVE MEETING ROOM SYSTEM

RELATED APPLICATION DATA

This application claims priority based on U.S. Provisional Application 60/325,792, filed Sep. 28, 2001 by Poston et al.

TECHNICAL FIELD

The present invention relates generally to meeting room systems. In particular, the present invention relates to technology that enables the organization, management, tracking and documentation of meetings.

BACKGROUND

Meeting managers use various tools to conduct meetings. Current meeting tools include whiteboards mounted on a wall, transparencies (i.e., overhead slides) displayed on an overhead projector, projected slides, and flipcharts placed on an easel, as well as manually kept meeting minutes, agendas, and action lists. There are also electronic products that facilitate meeting management, including group calendar capability, conference calling, and presentation programs such as PowerPoint manufactured by Microsoft Corporation of Redmond, Wash.

Many of these tools, however, provide only a partial solution to conducting meetings. They fail to provide for the creation, distribution and maintenance of meeting documentation such as a meeting agenda and meeting minutes. In addition, many of the electronic tools are intended to enable participants to attend meetings from remote locations, for example, an office via a personal computer, rather than having all participants in one meeting room.

Meeting managers and participants might appreciate tools that aid in organizing, managing, tracking and documenting meetings in which most or all of the meeting participants are in one room. These tools might be even more beneficial if they automated various meeting-related actions, including planning the meeting, helping the meeting begin, progress and end on time, and documenting important parts of the meeting in real-time, for use by multiple people during and after the meeting. They might also appreciate tools that enable them to organize information and share it in a way that captures the essence of the meeting, while maintaining control over what is shared and what is private.

SUMMARY

A collaborative meeting room system (CMRS) provides seamless organization, management, tracking and documentation of meetings by integrating new capabilities with existing tools. The CMRS creates an environment for conducting meetings that allows participants to be in the same meeting room, in different meeting rooms in the same location, or in different meeting rooms in different locations. Meeting information including meeting room, participants, times and tasks are arranged in one database, while agenda items and meeting minutes are arranged in the same database or a separate database. Meeting organizers can structure the meeting prior to the meeting. Meeting participants can view agenda items, task assignments and meeting minutes and participate in brainstorming and voting. The history of the meeting is saved for later review and statistical analysis. The CMRS also provides data security, backup and recovery.

BRIEF DESCRIPTION OF THE DRAWINGS

The present invention will be described by way of exemplary embodiments, but not limitations, illustrated in the accompanying drawings in which like references denote similar elements, and in which:

FIG. 7A illustrates an example of the user interface to a meeting math component of the collaborative meeting room system featuring a total cost display;

FIG. 7B illustrates an example of the user interface to a meeting math component of the collaborative meeting room system featuring a total hours display;

FIG. 7C illustrates an example of the user interface to a meeting math component of the collaborative meeting room system featuring a user hours display;

FIG. 7D illustrates an example of the user interface to a meeting math component of the collaborative meeting room system featuring a weekly average display;

DETAILED DESCRIPTION

In the following description various aspects of the present invention, a collaborative meeting room system (CMRS), are described. Specific details are set forth in order to provide an understanding of the present invention. It will be apparent to those skilled in the art that the present invention may be practiced with only some or all of the described aspects of the present invention, and with or without some or all of the specific details. In some instances, well-known features may be omitted or simplified in order not to obscure the present invention.

Various operations are described as multiple discrete steps performed in turn in a manner that is most helpful in understanding the present invention. However, the order of description should not be construed to imply that these operations are necessarily performed in the order they are presented, or even order dependent. Lastly, repeated usage of the phrases "in one embodiment" and "in the embodiment" does not necessarily refer to the same embodiment, although it may.

Figure 1A:
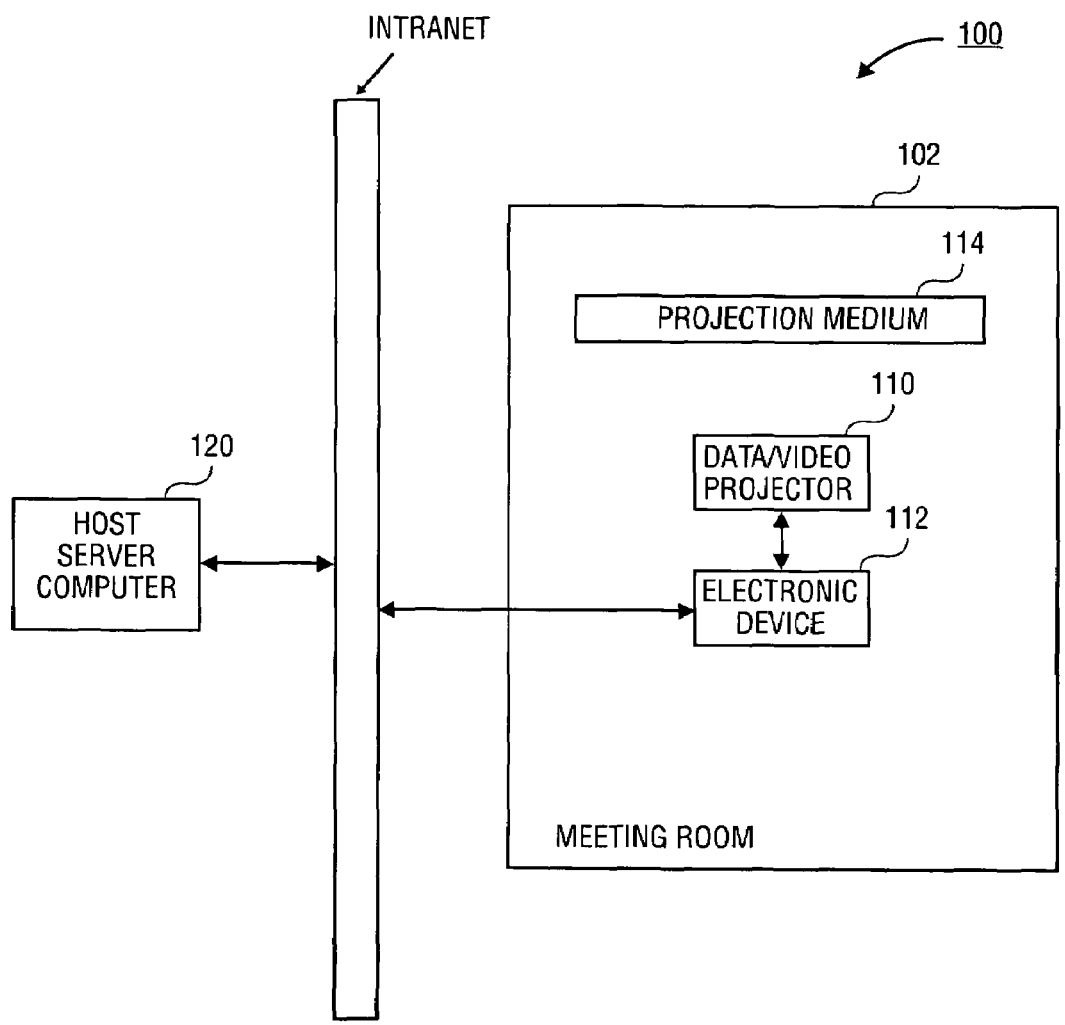
FIG. 1A illustrates an overview of an operating environment in which a collaborative meeting room system may be used.

FIG. 1A illustrates an example operating environment 100 in which a CMRS may be used. FIG. 1A shows meeting room 102, in which data/video projector 110 is connected with electronic device 112, which is connected with server host computer 120. Electronic device 112 may be connected with server host computer 120 via an intranet, e.g., intranet 116, a local area network, a metropolitan area network, a wide area network (e.g., the Internet) or other type of wired connection/network, or via a wireless connection/network, e.g., an Institute of Electrical Engineers (IEEE) 802.11x network or a BlueTooth network. Alternatively, data/video projector 110 may be connected directly with server host computer 120 via a wired or wireless connection/network.

Data/video projector 110, e.g., a LP650 projector manufactured by Infocus Corporation of Wilsonville, Oreg., is connected to electronic device 112, e.g., a personal computer (PC) or a laptop computer, which accesses information in server host computer 120, as is known in the art. Data/video projection 110 then projects on projection display medium 114, e.g., a projection screen or a wall in meeting room 102, a meeting conductor component of the CMRS including the information accessed in server host computer 120. Thus, meeting participants in meeting room 102 can view the progress of the meeting, including timing of the meeting, discussion of agenda items, recording of meeting minutes and assignment of tasks. In addition, the multiple input feature of the CMRS allows participants to provide meeting input in real-time. Input can include meeting minutes, brainstorming ideas, voting, assigning tasks, inserting information into a display and/or selecting information to be displayed, and can be provided via keyboard, PC, personal digital assistant (PDA), electronic sketchpad, and/or other wired devices, and/or via wireless devices, for example, IEEE 802.11x devices and BlueTooth devices.

Figure 1B:
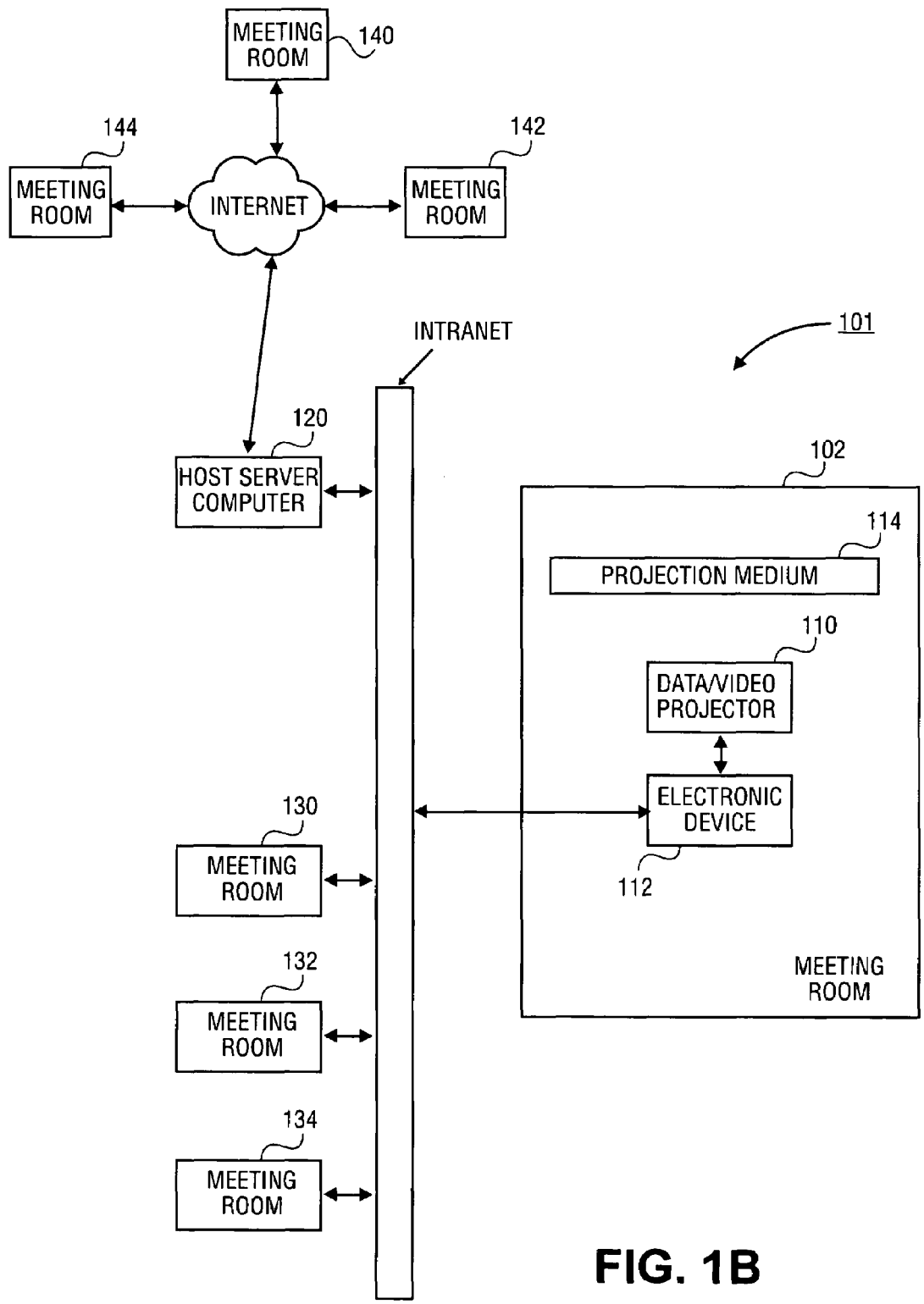
FIG. 1B illustrates an overview of an alternative operating environment in which a collaborative meeting room system may be used.

Although the CMRS will be described in terms of the operating environment illustrated in FIG. 1A, FIG. 1B illustrates an alternative operating environment 101 in which an embodiment of the CMRS may be used. In FIG. 1B, data/video projector 110 is connected, via intranet 116, with other meeting rooms in the same location as meeting room 102, e.g., meeting rooms 130, 132 and 134, as well as with remote meeting rooms, e.g., meeting rooms 140, 142 and 144, via a metropolitan area network or a wide area network, e.g., Internet 150.

Figure 2:
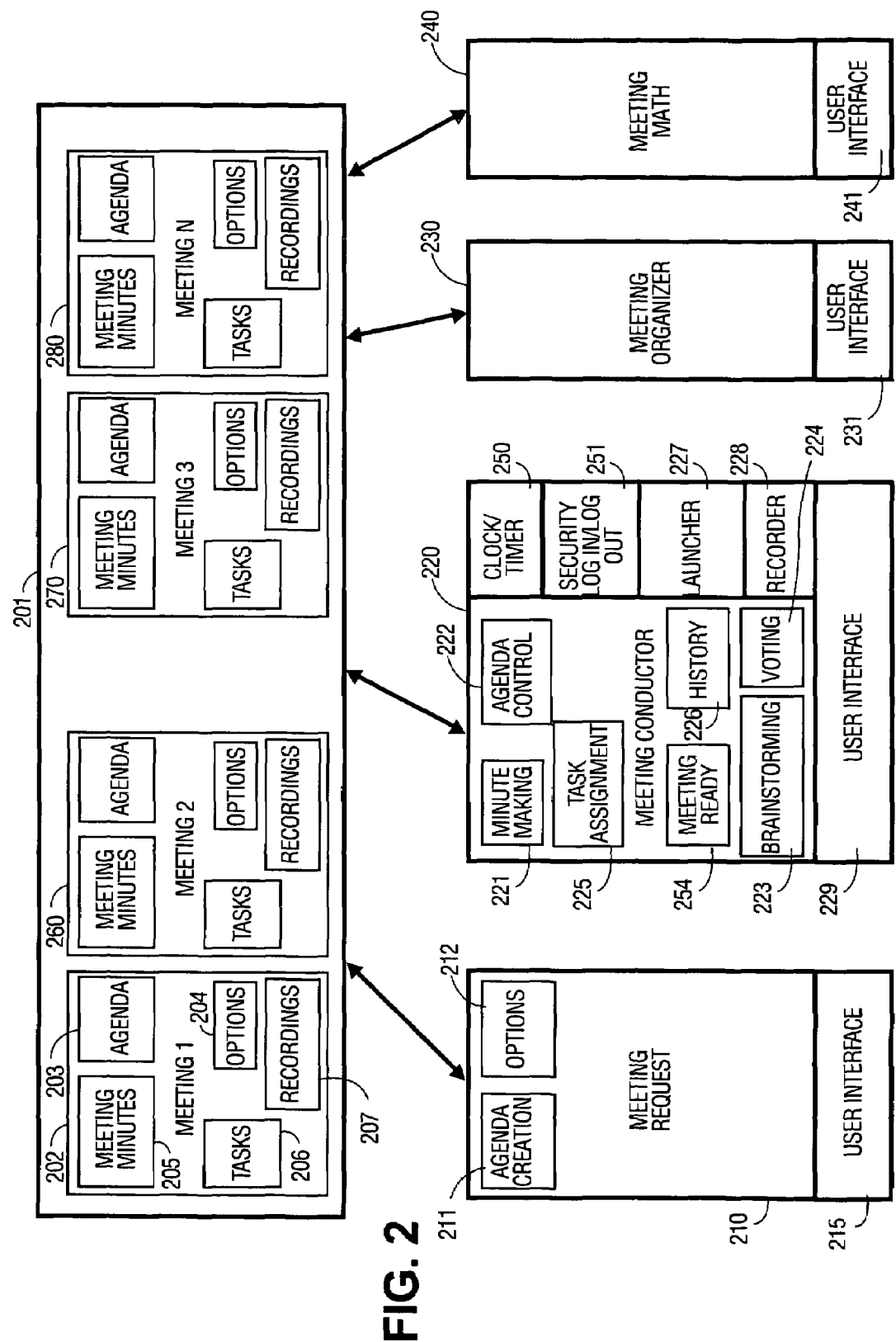
FIG. 2 is a block diagram of one embodiment of a collaborative meeting room system.

FIG. 2 is a block diagram of one embodiment of the CMRS. The blocks of FIG. 2 represent various hardware and/or software components that exist in one or more of the electronic systems of FIG. 1A and FIG. 1B. The CMRS integrates various meeting-related actions, including agenda creation and distribution, minute taking, brainstorming, voting and assignment of tasks into one tool, where the meeting is conducted with all meeting participants in one meeting room or in multiple meeting rooms, where the meeting rooms are in the same location or in a remote locations. In the illustrated embodiment, the CMRS consists of agenda creation and options features of meeting scheduler 210, meeting conductor 220, meeting organizer 230, and meeting math 240. The CRMS can consist of more, fewer and/or different components. In one embodiment, the CMRS runs on server host computer 120. In another embodiment, the CMRS runs on video/data projector 110, or on electronic device 112 connected to video/data projector 110.

Agenda creation 211 and options 212 are tools a meeting organizer uses while setting up a meeting. Meeting scheduler 210 enables a meeting organizer to schedule a meeting, invite participants and schedule a meeting room, while agenda creation 211 enables the meeting organizer to create an agenda for the meeting. The information resulting from the creation of an agenda is stored in meeting database 201, e.g., as part of meeting 1 information 202, meeting 2 information 260, meeting 3 information 270, or meeting N information 280 (where N represents any number of meetings for which meeting database 201 stores meeting information). For purposes of illustration and ease of explanation, FIG. 2 will be described in terms of storing meeting information in meeting 1 database 202. As explained in more detail below, options 212 gives the meeting organizer control over whether meeting invitees can alter meeting information in meeting database 201.

Figure 3A:
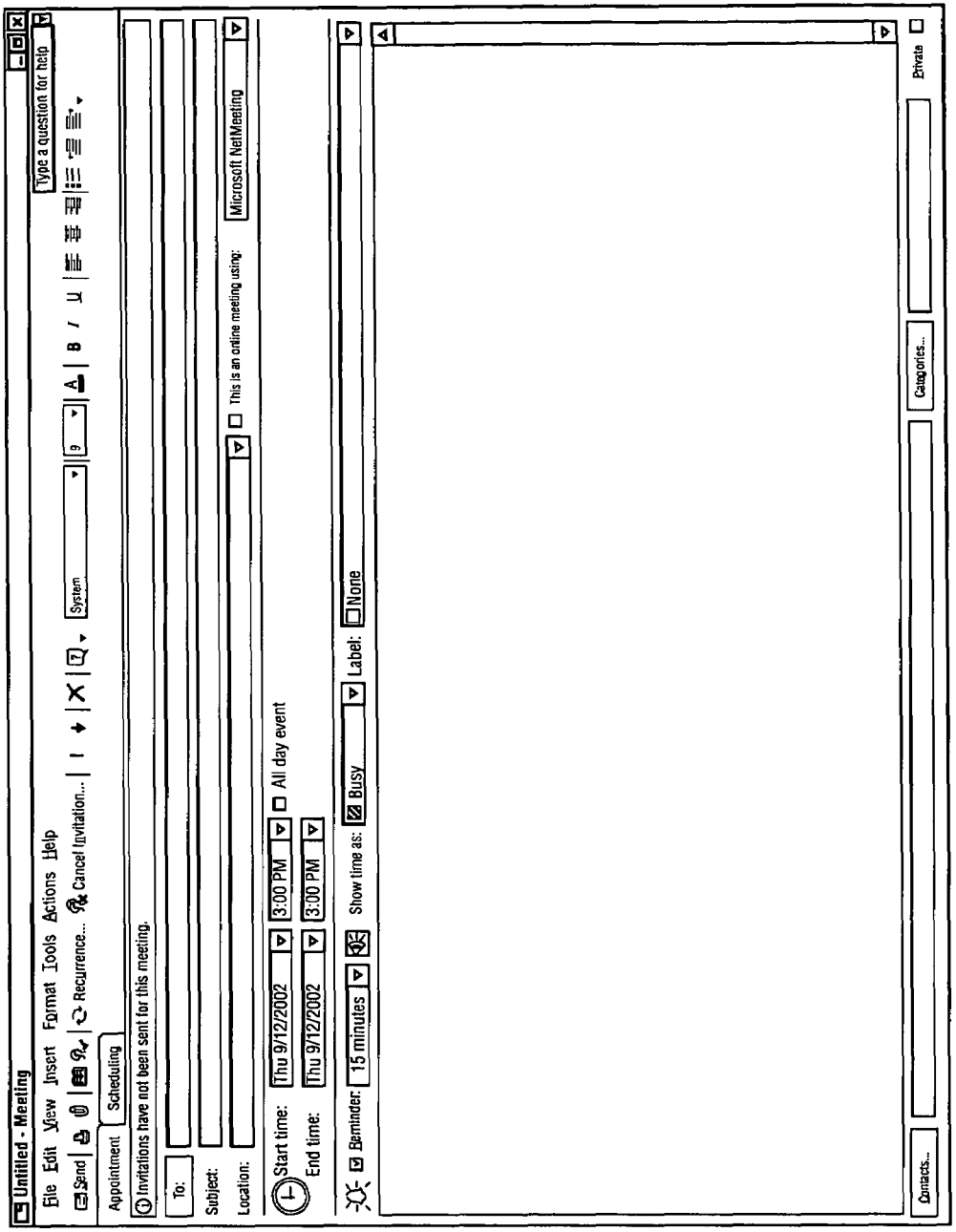
FIG. 3A illustrates an example of the user interface to a meeting scheduler.

FIG. 3A illustrates an example of user interface 215 for meeting scheduler 210. Meeting scheduler 210 can be any meeting scheduling application, e.g., Microsoft Outlook, manufactured by Microsoft Corporation, Lotus Notes manufactured by International Business Machines Corporation of Armonk, N.Y. For purposes of illustration, meeting scheduler 210 will be described in terms of Microsoft Outlook.

Figure 3B:
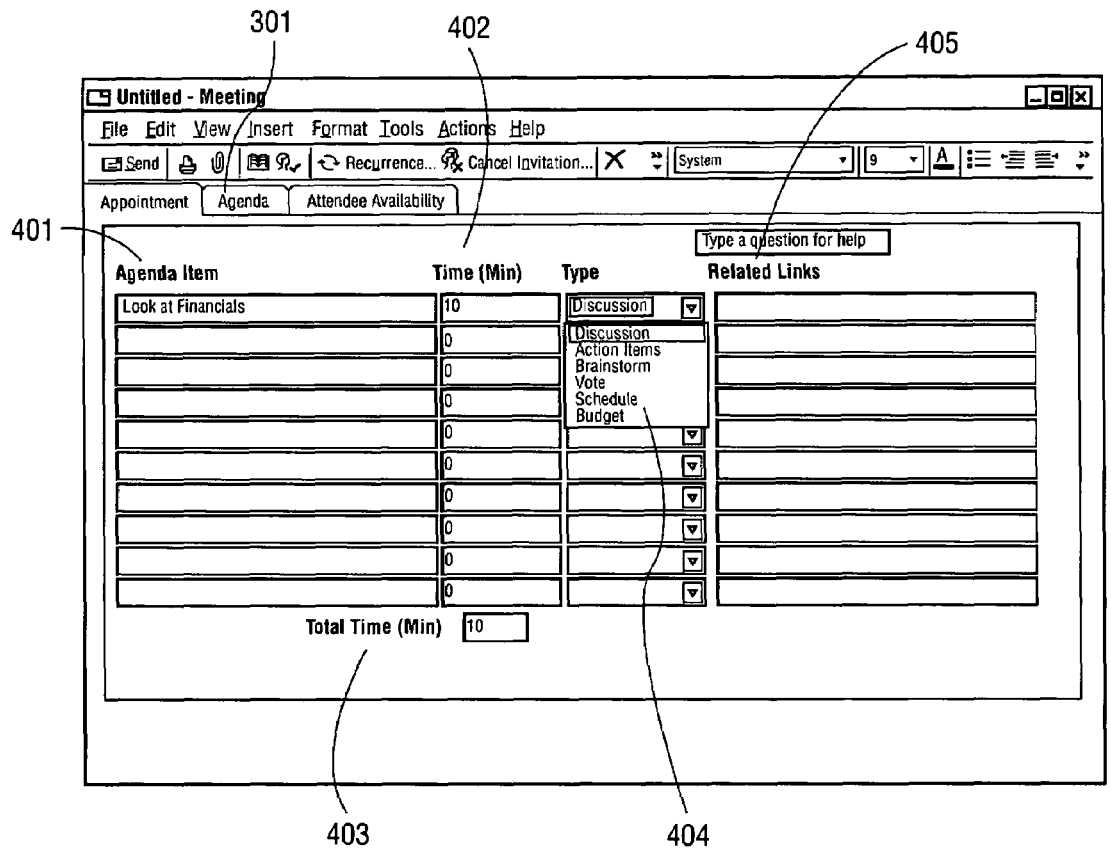
FIG. 3B illustrates an example of the user interface to a meeting scheduler including an agenda creation interface.
Figure 4:
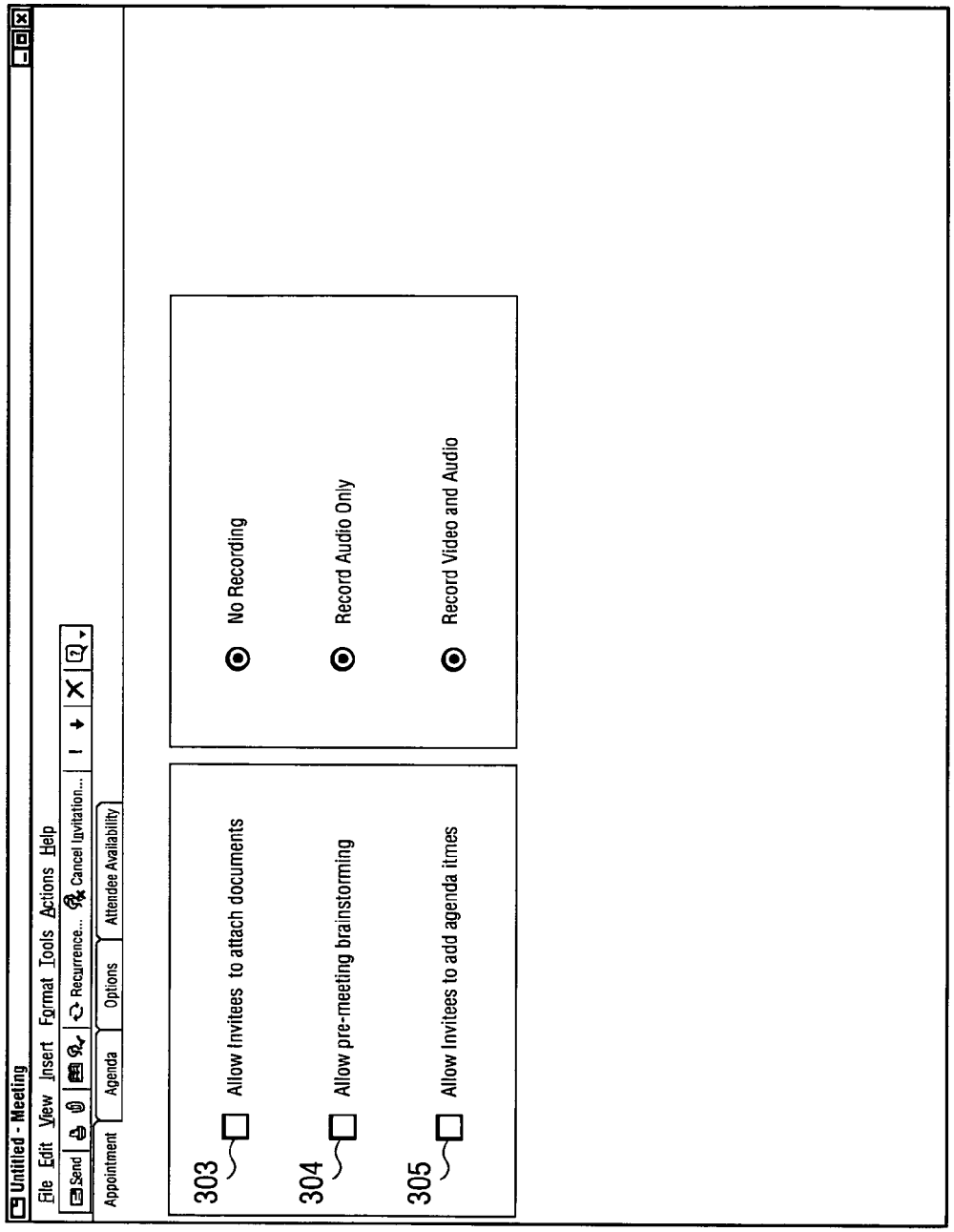
FIG. 4 illustrates an example of the user interface to a meeting scheduler including an options interface.
Figure 5A:
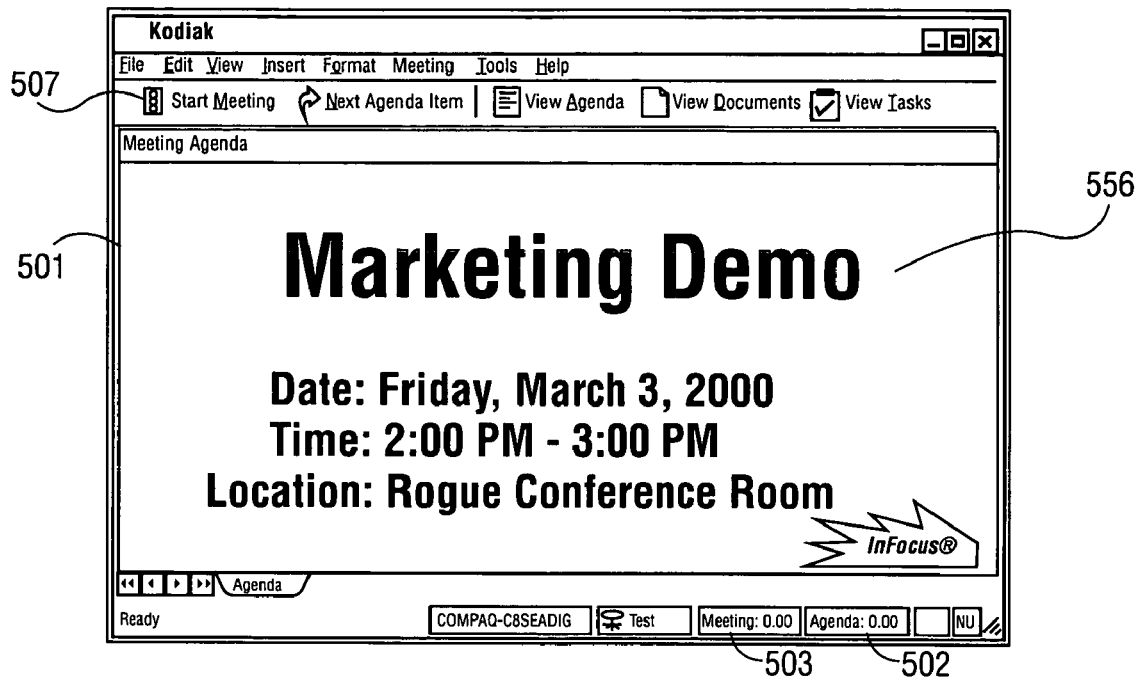
FIG. 5A illustrates an example of a display of a meeting conductor component of the collaborative meeting room system including meeting-ready information.
Figure 5B:
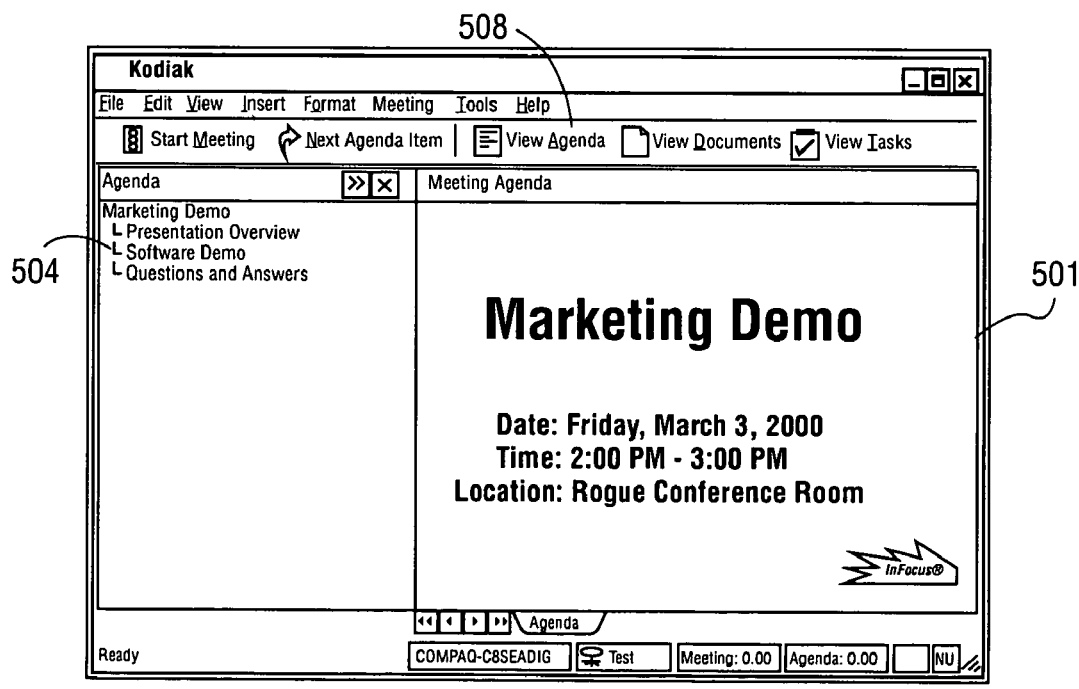
FIG. 5B illustrates an example of a display of a meeting conductor component of the collaborative meeting room system featuring the agenda listing.
Figure 5C:
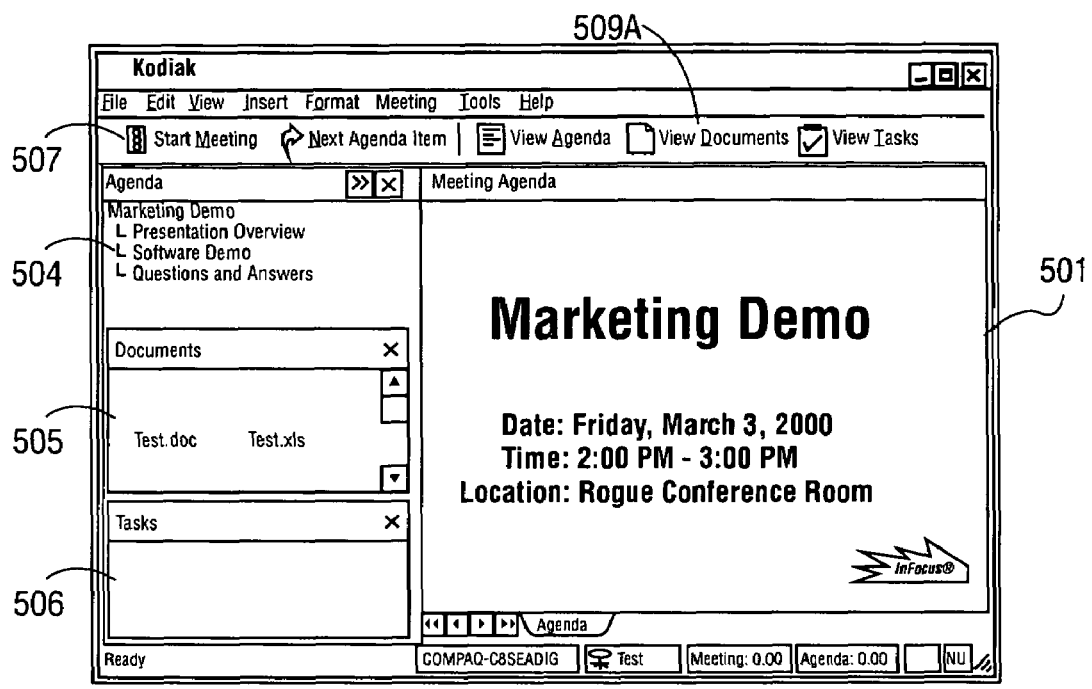
FIG. 5C illustrates an example of a display of a meeting conductor component of the collaborative meeting room system featuring the agenda, documents, and tasks listings.
Figure 5D:
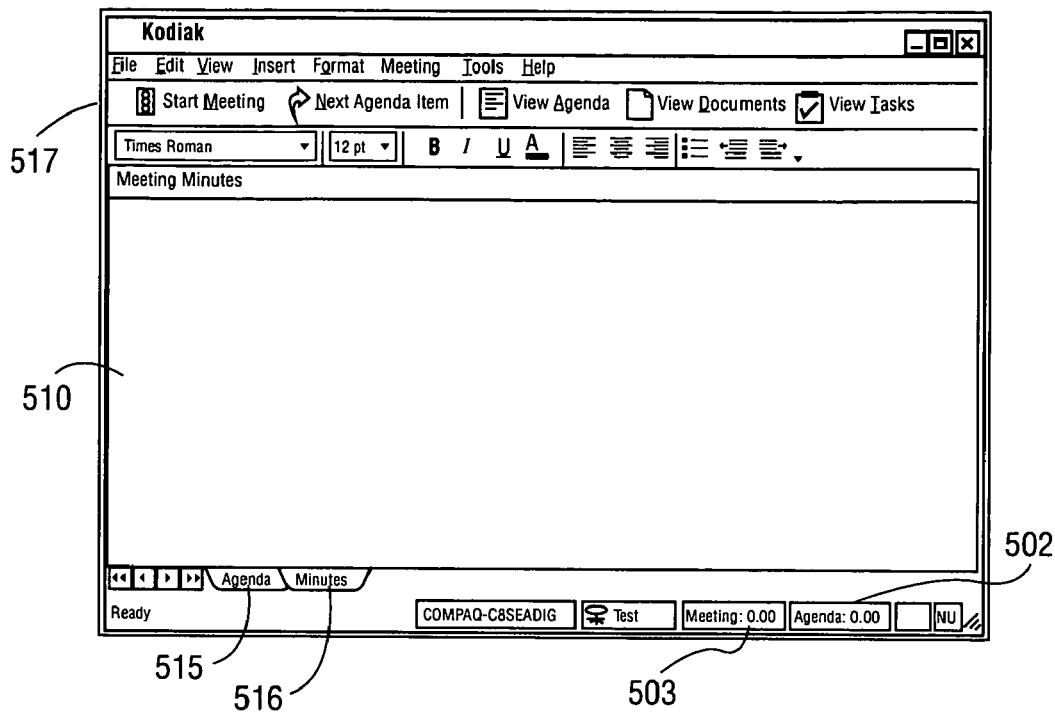
FIG. 5D illustrates an example of a display of a meeting conductor component of the collaborative meeting room system featuring a minutes display.
Figure 5E:
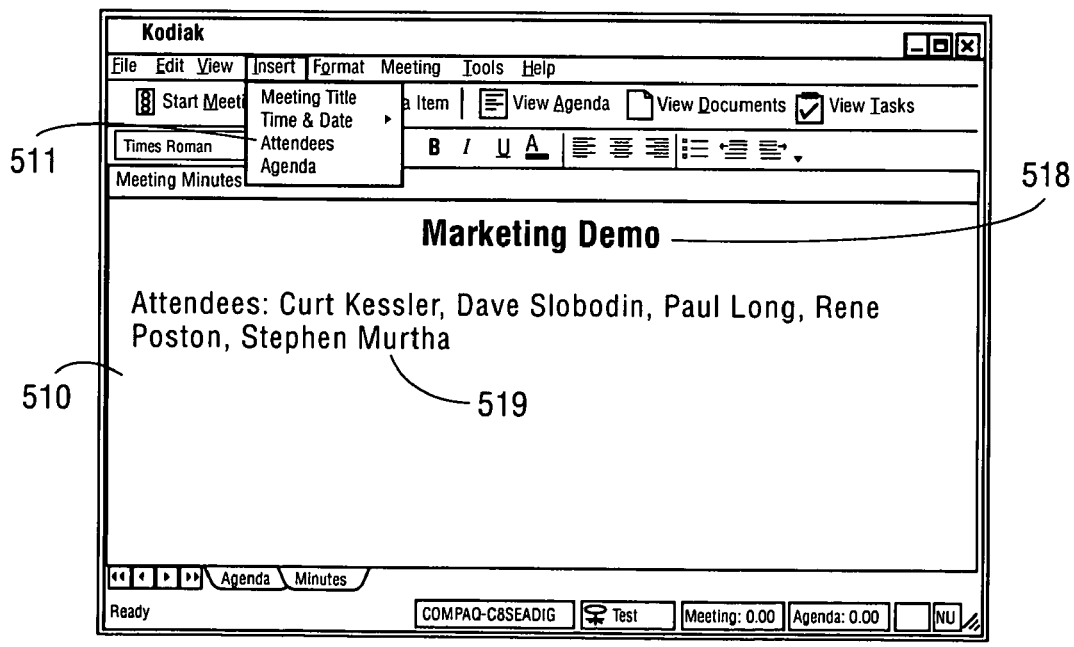
FIG. 5E illustrates an example of a display of a meeting conductor component of the collaborative meeting room system featuring a minutes insert function.
Figure 5F:
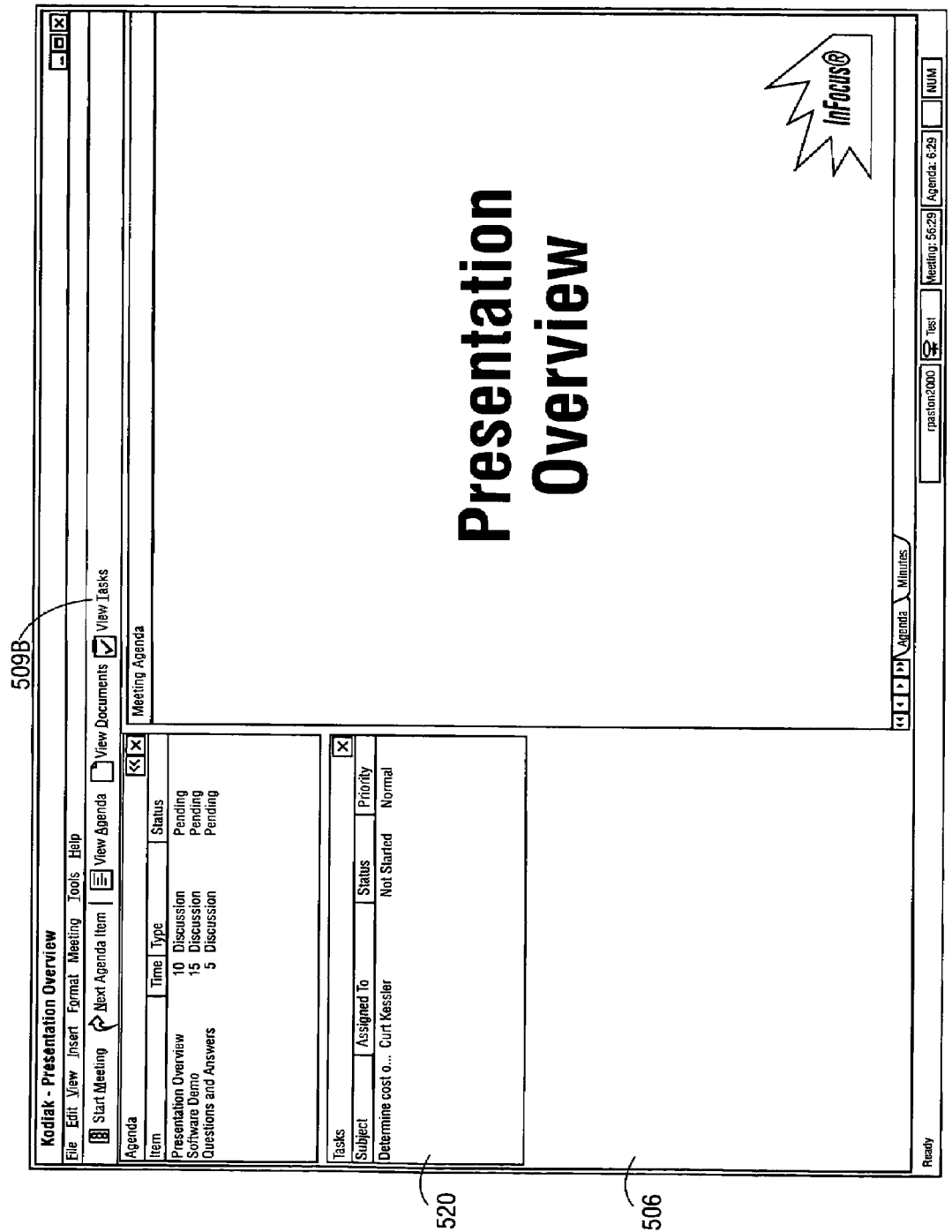
FIG. 5F illustrates an example of a display of a the meeting conductor component of the collaborative meeting room system featuring tasks and minutes displays.
Figure 5G:
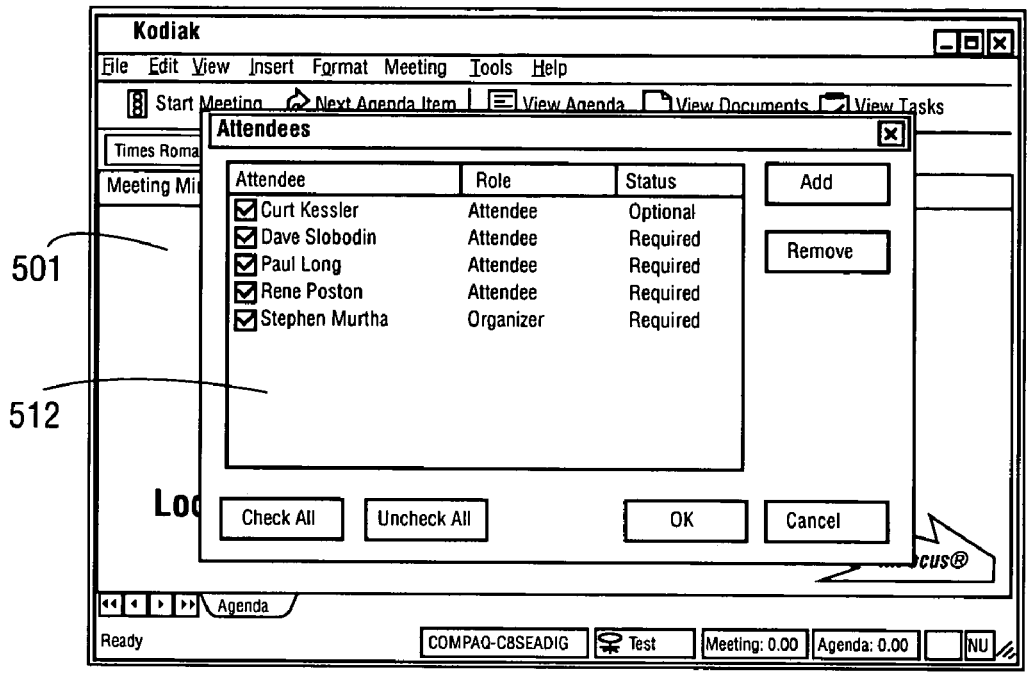
FIG. 5G illustrates an example of a display of a meeting conductor component of the collaborative meeting room system featuring the attendees pop-up window.
Figure 5H:
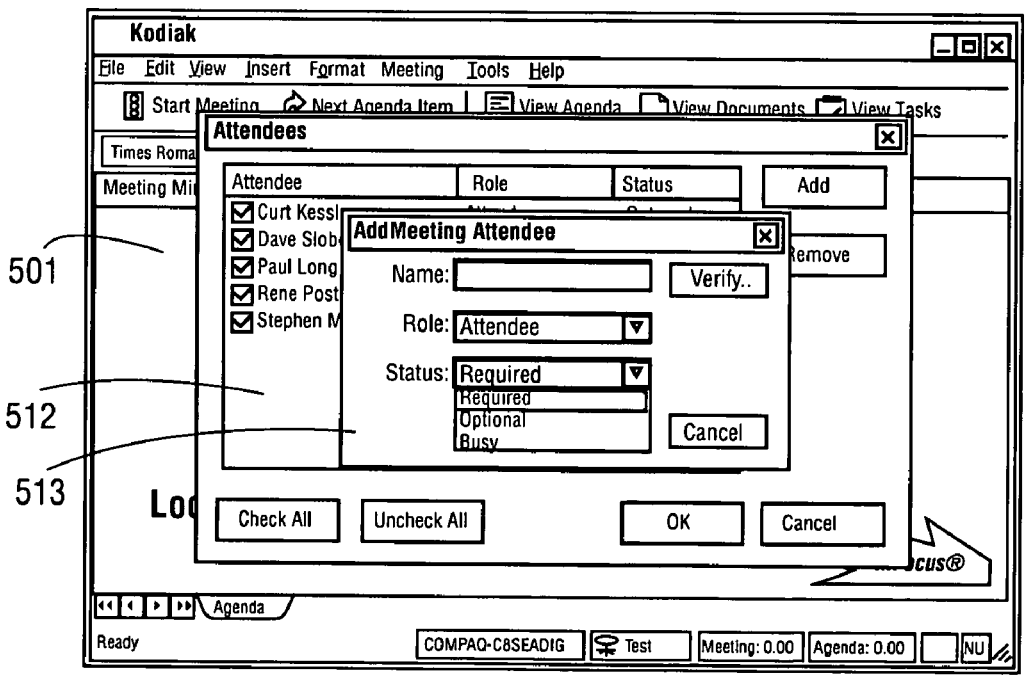
FIG. 5H illustrates an example of a display of a meeting conductor component of the collaborative meeting room system featuring the add attendee function.
Figure 5I:
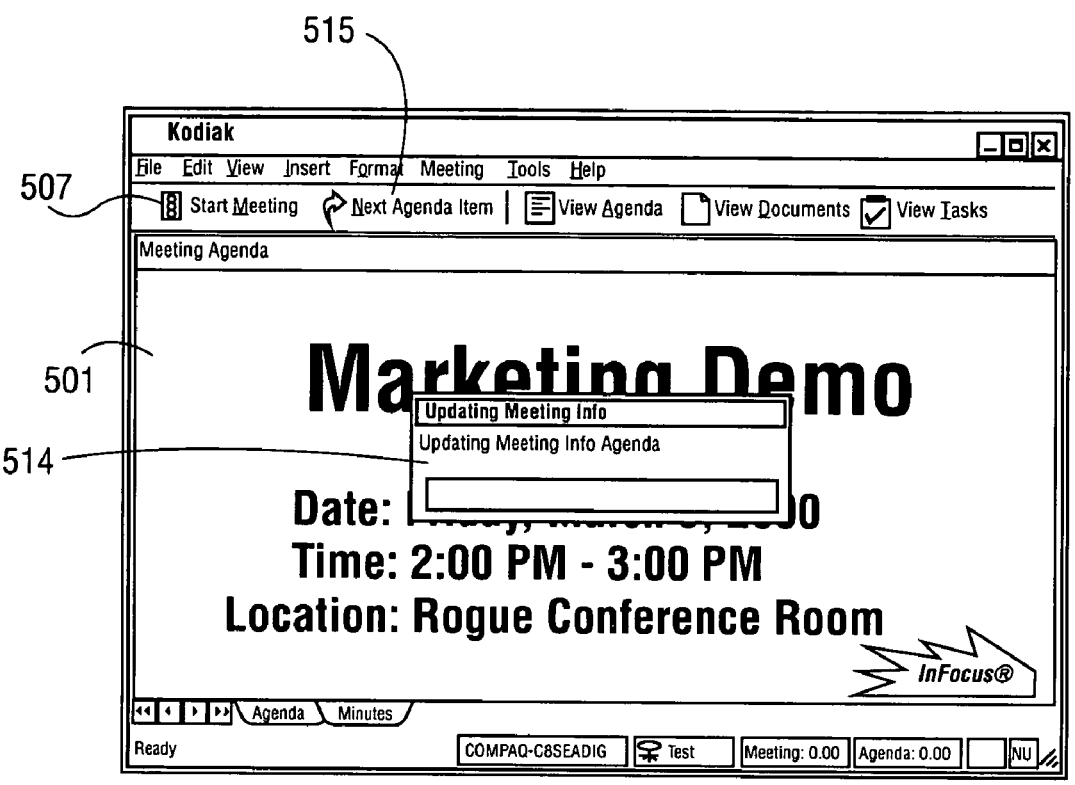
FIG. 5I illustrates an example of a display of a meeting conductor component of the collaborative meeting room system featuring the update meeting information pop-up window displayed at the end of a meeting.
Figure 6:
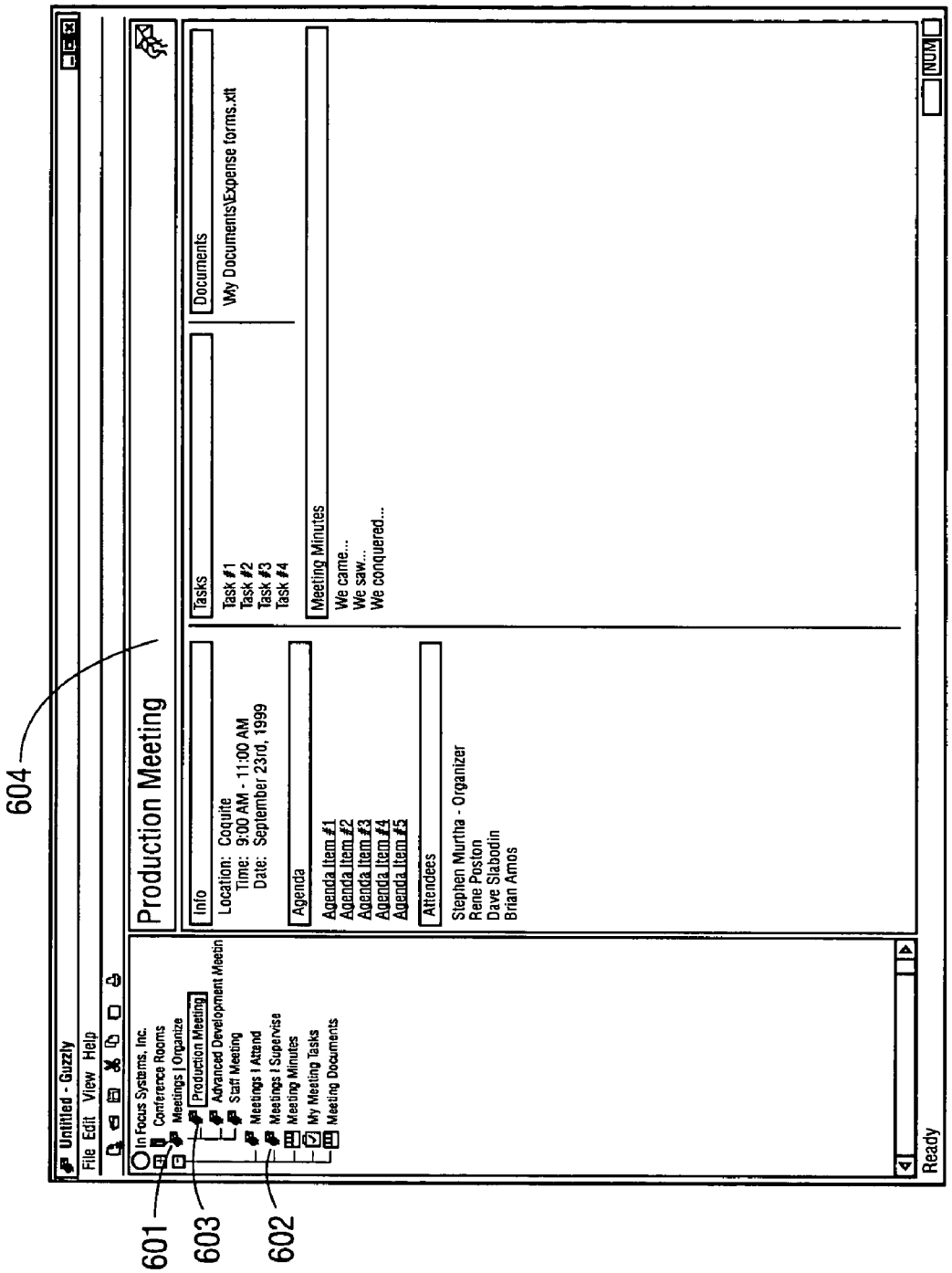
FIG. 6 illustrates an example of the user interface to a meeting organizer component of the collaborative meeting room system.
Figures 8A, 8B:
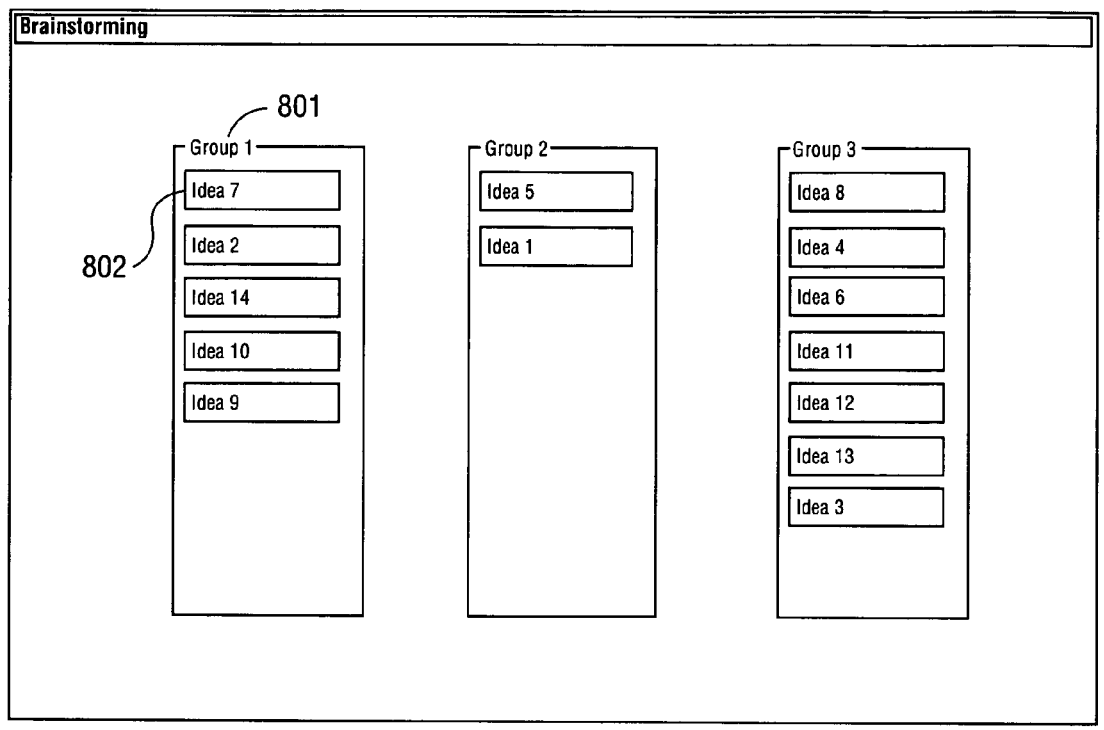
FIG. 8A illustrates an example of a display of a brainstorming component of the collaborative meeting room system.
FIG. 8B illustrates an example of the user interface to a brainstorming component of the collaborative meeting room system.
Figure 9:
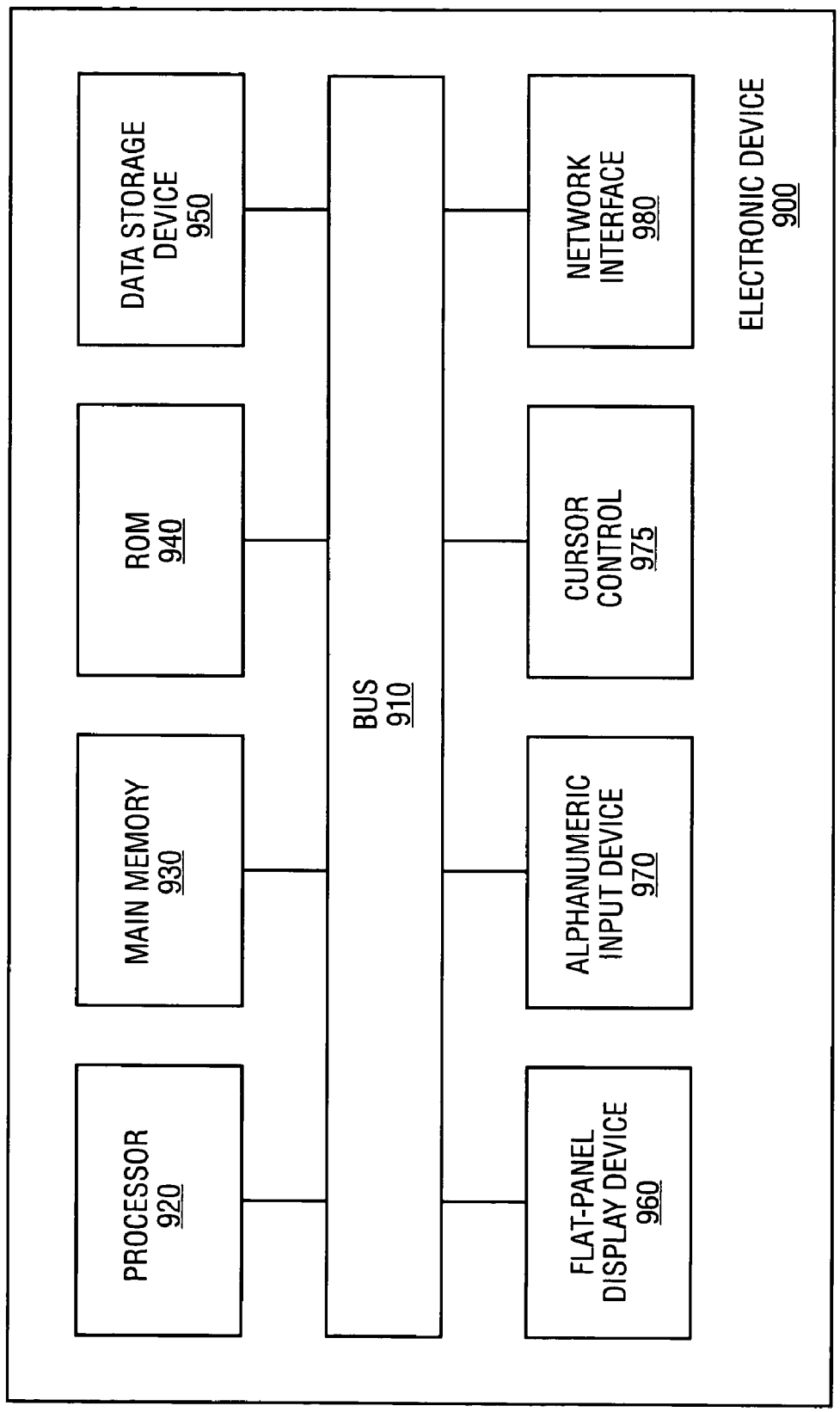
FIG. 9 illustrates a block diagram of one example of an electronic system on which an embodiment of the collaborative meeting room system may be run.
Figure 10:
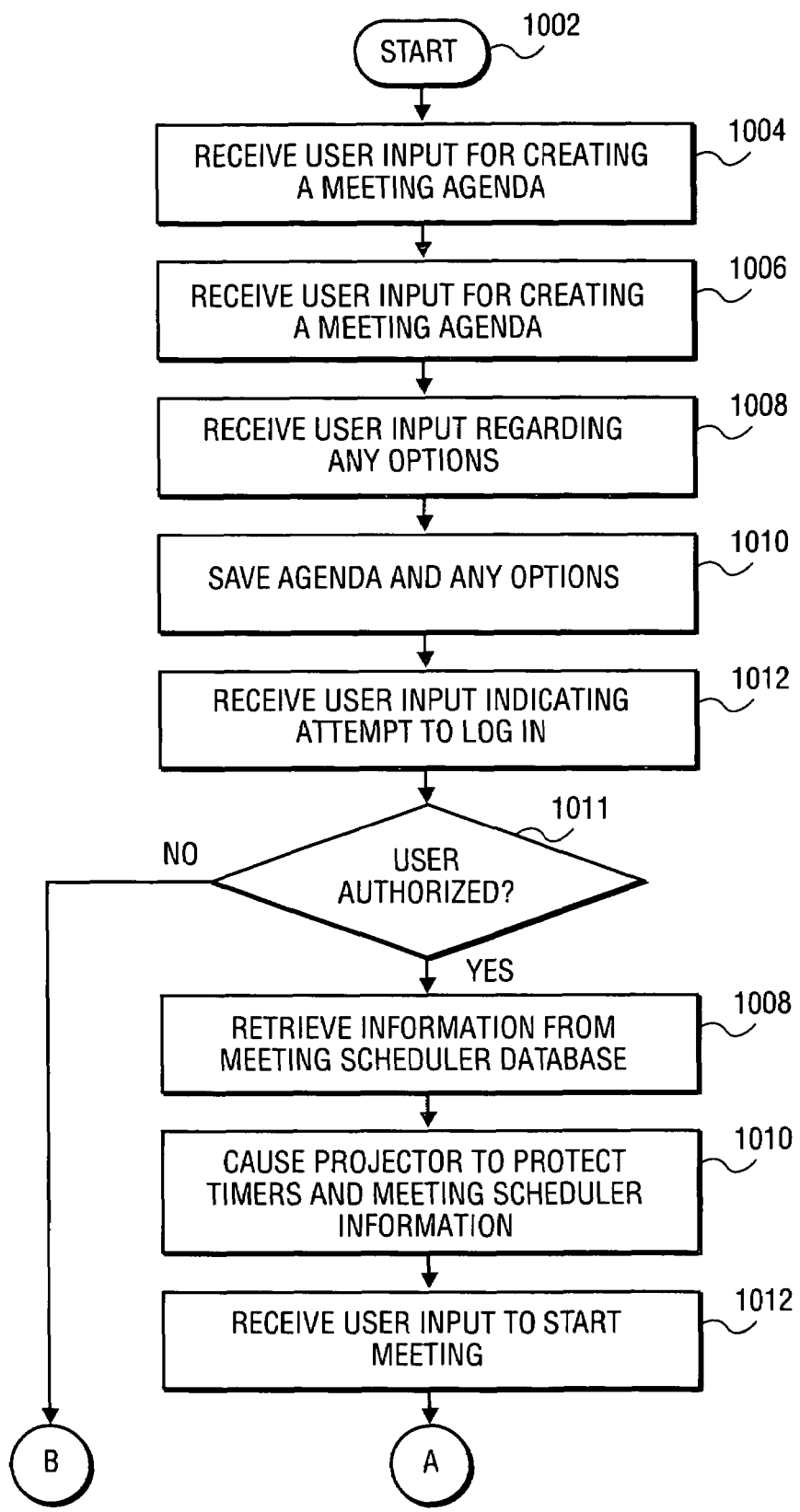
FIG. 10 illustrates a method performed by a collaborative meeting room system.
Figure 11:
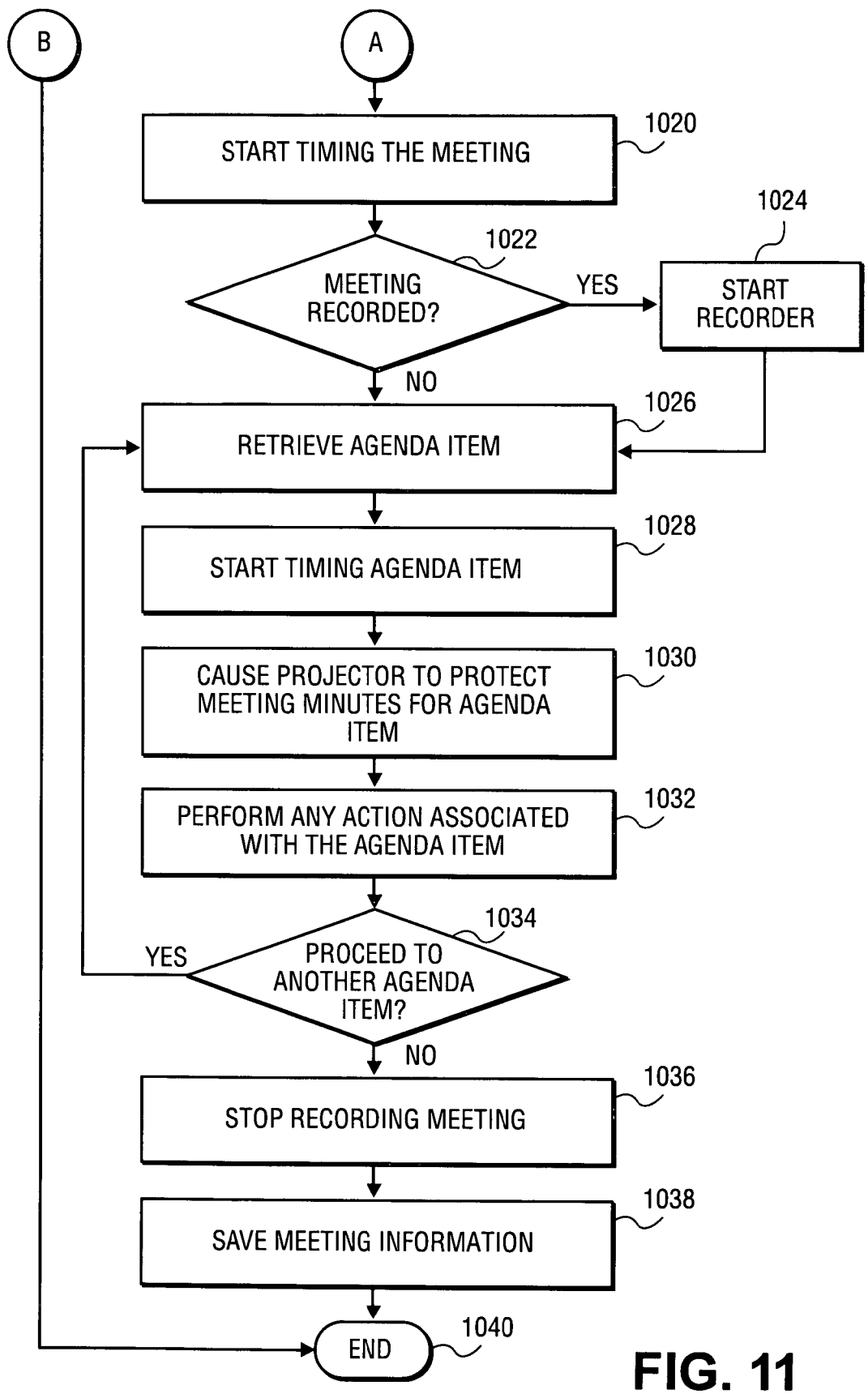
FIG. 11 illustrates a continuation of the method performed by a collaborative meeting room system.

FIG. 3B illustrates an example of user interface 215 for meeting scheduler 210 after the addition of agenda creation 211. Agenda creation 211 is a plug-in to meeting scheduler 210, as illustrated by the addition of agenda tab 301 to Microsoft Outlook in FIG. 3B.

Once agenda tab 301 is selected, a meeting organizer uses an input device to enter agenda items 401 and assign the amount of time 402 necessary for each agenda item 401. A user can add time to an agenda item 401 during the meeting, e.g., by selecting an additional time option from a drop down menu. Agenda creation 211 calculates total time 403 for the meeting based on the amount of time 402 for each agenda item 401. In addition, the user assigns each agenda item 401 an agenda type 403. As illustrated in FIG. 3B, agenda type 404 can include discussion, action items, brainstorm, vote, schedule, and budget, for example. In addition, each agenda item 401 can have related links 405, which associates a presentation file(s), data file(s), or an application(s), for example, with each agenda item 401. Each agenda item 401, amount of time 402, total time 403, agenda type 404 and any related links 405 are stored as agenda 203 of meeting 1 information 202.

What is claimed is:

1. A method, comprising:
   receiving a user input;
   after receiving the user input, starting a running meeting timer to begin timing a meeting at which a previously-created meeting agenda is used, the running meeting timer being started in response to user input;
   after starting the running meeting timer, causing a projection device to project the running meeting timer, the running meeting timer being projected as a result of starting the meeting timer and providing a dynamic indication of an elapsed meeting duration;
   after starting the running meeting timer, retrieving an agenda item included in the previously-created meeting agenda, the agenda item being retrieved as a result of starting the running meeting timer; and
   after retrieving the agenda item, causing a projection device to project meeting minutes for the agenda item, the meeting minutes being projected as a result of retrieving the agenda item.

2. The method of claim 1, further comprising:
   receiving user input to stop timing the meeting;
   after receiving the user input, stopping the running meeting timer to end timing the meeting, the running meeting timer being stopped as a result of the user input; and
   after stopping the running meeting timer, saving the meeting minutes, the meeting minutes being saved as a result of stopping the meeting timer.

3. The method of claim 1, further comprising:
   starting a running agenda timer to begin timing the agenda item after retrieving the agenda item, the running agenda timer being started as a result of retrieving the agenda item;
   after starting the running agenda timer, causing the projection device to display the running agenda timer, the running agenda timer being displayed as a result of starting the running agenda timer; and
   ending the running agenda timer to end timing the agenda item, as a result of receiving an indication to stop timing the agenda item.

4. The method of claim 3, wherein receiving an indication to stop timing the agenda item comprises receiving user input to retrieve another agenda item.

5. The method of claim 1, further comprising creating a meeting agenda based on user input.

6. The method of claim 5, wherein creating a meeting agenda based on user input comprises:
   causing a user interface to display an agenda item field for receiving user input identifying the agenda item; and
   causing the user interface to display a time field for receiving user input identifying an amount of time for the agenda item.

7. The method of claim 6, further comprising:
   causing the user interface to display an agenda type field for receiving user input identifying an agenda type of the agenda item.

8. The method of claim 6, further comprising:
   causing the projection device to project a user interface associated with the agenda type after retrieving the agenda item, the user interface being projected as a result of retrieving the agenda item.

9. The method of claim 8, wherein the agenda type comprises a brainstorming agenda type.

10. The method of claim 8, wherein the agenda type comprises a voting agenda type.

11. The method of claim 6, further comprising:
    causing the user interface to display a link field for receiving user input identifying a link related to the agenda item.

12. The method of claim 11, further comprising:
    launching the link, as a result of retrieving the agenda item.

13. The method of claim 12, further comprising:
    causing the projection device to project the link.

14. The method of claim 1, further comprising:
    receiving user input attempting to log in;
    determining whether a user is authorized to log in;
    logging in the user, if the user is authorized to log in;
    after logging in the user, retrieving meeting-ready information associated with the meeting, the meeting-ready information being retrieved as a result of logging in the user; and
    after retrieving the meeting-ready information, causing the projection device to project the meeting-ready information, the meeting-ready information being projected as a result of retrieving the meeting-ready information.

15. The method of claim 14, wherein the meeting-ready information comprises:
    a meeting title; and
    a meeting date.

16. An article of manufacture comprising:
    a machine-accessible medium including thereon sequences of instructions that, when executed, cause an electronic system to:
    start a running meeting timer to begin timing a meeting at which a previously-created meeting agenda is used, in response to user input;
    after starting the running meeting timer, cause a projection device to project the running meeting timer, the running meeting timer being projected as a result of starting the running meeting timer;
    after starting the running meeting timer, retrieve an agenda item included in the previously-created meeting agenda, the agenda item being retrieved as a result of starting the running meeting timer; and
    after retrieving the agenda item, cause a projection device to project meeting minutes for the agenda item, the meeting minutes being projected as a result of retrieving the agenda item.

17. The article of manufacture of claim 16, wherein the machine-accessible medium further comprises sequences of instructions that, when executed, cause the electronic system to:
    receive user input to stop timing the meeting;
    stop the running meeting timer to end timing the meeting; and
    after stopping the running meeting timer, save the meeting minutes, the meeting minutes being saved as a result of stopping the timer.

18. The article of manufacture of claim 16, wherein the machine-accessible medium further comprises sequences of instructions that, when executed, cause the electronic system to:
    after retrieving the agenda item, start a running agenda timer to begin timing the agenda item, the agenda item being timed as another result of retrieving the agenda item; and
    after retrieving the agenda item, cause the projection device to display the running agenda timer, the running agenda timer being displayed as a result of starting the running agenda timer.

19. The article of manufacture of claim 18, wherein the sequences of instructions that, when executed, cause the electronic system to end the agenda timer to end timing the agenda item, as the result of receiving an indication to stop timing the agenda item, comprise sequences of instructions that, when executed, cause the electronic system to end timing the agenda item, as a result of receiving user input to retrieve another agenda item.

20. A method, comprising:
- after receiving user input, starting a running meeting timer to begin timing a meeting at which a previously-created meeting agenda is used, the running meeting timer being started in response to user input;
- after starting the running meeting timer, projecting a running meeting timer, the running meeting timer being projected as a result of starting the running meeting timer;
- after starting the running meeting timer, retrieving an agenda item included in the previously-created meeting agenda, the agenda item being retrieved as a result of starting the running meeting timer; and
- after retrieving the agenda item, projecting meeting minutes for the agenda item, the meeting minutes being projected as a result of retrieving the agenda item.

21. An article of manufacture comprising:
- a machine-accessible medium including thereon sequences of instructions that, when executed, cause a projection device to:
- start a running meeting timer to begin timing a meeting at which a previously-created meeting agenda is used after receiving a user input, the running meeting timer being started in response to user input;
- after starting the running meeting timer, project the running meeting timer, the running meeting timer being projected as a result of starting the running meeting timer;
- after starting the running meeting timer, retrieve an agenda item included in the previously-created meeting agenda, the agenda item being retrieved as a result of starting the running meeting timer; and
- after retrieving the agenda item, project meeting minutes for the agenda item, the meeting minutes being projected as a result of retrieving the agenda item.

22. A method, comprising:
- receiving a previously-created meeting agenda including a plurality of meeting topics;
- receiving a user input to start a running meeting timer associated with the previously-created meeting agenda;
- after receiving user input, starting the running meeting timer, the running meeting timer being started in response to receiving the user input;
- after starting the running meeting timer, automatically causing a projection device to project the running meeting timer;
- after receiving the user input, automatically retrieving a first of the plurality of meeting topics;
- after retrieving the first of the plurality of meeting topics, automatically causing the projection device to project a running topic timer corresponding to the first of the plurality of meeting topics, and
- after retrieving the first of the plurality of meeting topics, automatically causing the projection device to project an editable field for maintaining a written account of the first of the plurality of meeting topics.

* * * * *